United States Patent Office 2,953,027
Patented Sept. 20, 1960

2,953,027
PICK-OFF DEVICES FOR GYROSCOPIC APPARATUS

Hugh B. Sedgfield, Hampton, England, assignor to The Sperry Gyroscope Company Limited, Brentford, England, a company of Great Britain Filed Mar. 4, 1957, Ser. No. 643,874

Claims priority, application Great Britain Mar. 7, 1956

3 Claims. (Cl. 74—5.6)

This invention relates to pick-off devices for producing a signal indicative of the relative position of two relatively movable parts. The invention is particularly but not exclusively applicable to pick-off devices for use with gyroscopic apparatus.

According to one aspect of the invention, a pick-off for detecting relative movement between two relatively movable parts comprises a quantity of electrically conductive liquid, two members respectively secured to or integral with the relatively movable parts or arranged to be relatively moved in a manner corresponding to the relative movement of the parts and adapted to define in the liquid an electrically conductive path which varies in resistance according to the relative positions of the members, and means responsive to the resistance of the said path.

According to a further aspect of the invention, a pick-off for detecting relative displacement between two relatively movable parts separated by an electrically conducting liquid comprises two members which can be secured to the relatively movable parts or otherwise arranged to be relatively moved in a manner corresponding to the relative movement of the parts, the two members being adapted to define in the liquid an electrically conductive path which varies in resistance according to the relative positions of the members, and means responsive to the resistance of the said path.

The electrically conductive path may form a closed circuit which constitutes a secondary circuit looped with a magnetic core of a transformer having a primary winding, means being provided which is responsive to variations in the impedance presented by the primary winding to a source of electromotive force.

Conveniently, one of the members carries the magnetic core and is formed with a generally horseshoe shaped passage which embraces a leg of the core and provides ends which open into a space between the two members filled with the conductive liquid, while the other member provides a flat or other suitable surface which is movable towards and away from the open ends of the horseshoe so as to vary the cross section, and hence the electrical resistance of the body of liquid which connects the open ends of the horseshoe and closes the circuit therearound.

In a preferred embodiment for measuring relative angular displacement between the two parts, two such transformer arrangements are mounted on the parts in a preferably symmetrical manner so that tilt in a given sense increases the resistance of one secondary path while decreasing that of the other, and the two primary windings are connected with other impedances into a bridge circuit adapted to have a source of electromotive force applied thereto and to provide an output which is a measure of the unbalance between the impedances of the primaries. Preferably the source of electromotive force is connected across the two primary windings in series, and two equal resistances are connected in series across the same source, while two output terminals are respectively connected between the two primary windings and between the two resistors.

In a typical application of the invention to a gyroscope, pick-offs according to the invention are arranged to provide signals in response to angular displacement of the gyroscope rotor casing about two axes perpendicular to the axis of the rotor. The gyroscope rotor casing is enclosed within a housing filled with mercury, and the mercury constitutes the conducting liquid in which the electrically conductive paths of the pick-offs are defined. Each pick-off has one of its members fixed to or integral with the rotor casing, and the other fixed to or integral with the housing. Two pick-offs incorporating the transformer arrangement are arranged at positions diametrically opposite the rotor shaft and have their primaries connected in one bridge circuit to provide a signal in response to angular displacement of the rotor casing about one axis. The pick-offs of a second similarly arranged pair are arranged orthogonally in relation to those of the first pair, and are connected to a second bridge circuit to provide a second signal in response to angular displacement of the rotor casing about an axis perpendicular to the said one axis.

In order that the invention may be clearly understood, an embodiment thereof will now be described with reference to the accompanying drawings. In the drawings:

Fig. 4 is a section through a pick-off on the line IV—IV of Fig. 1.

Figure 1:
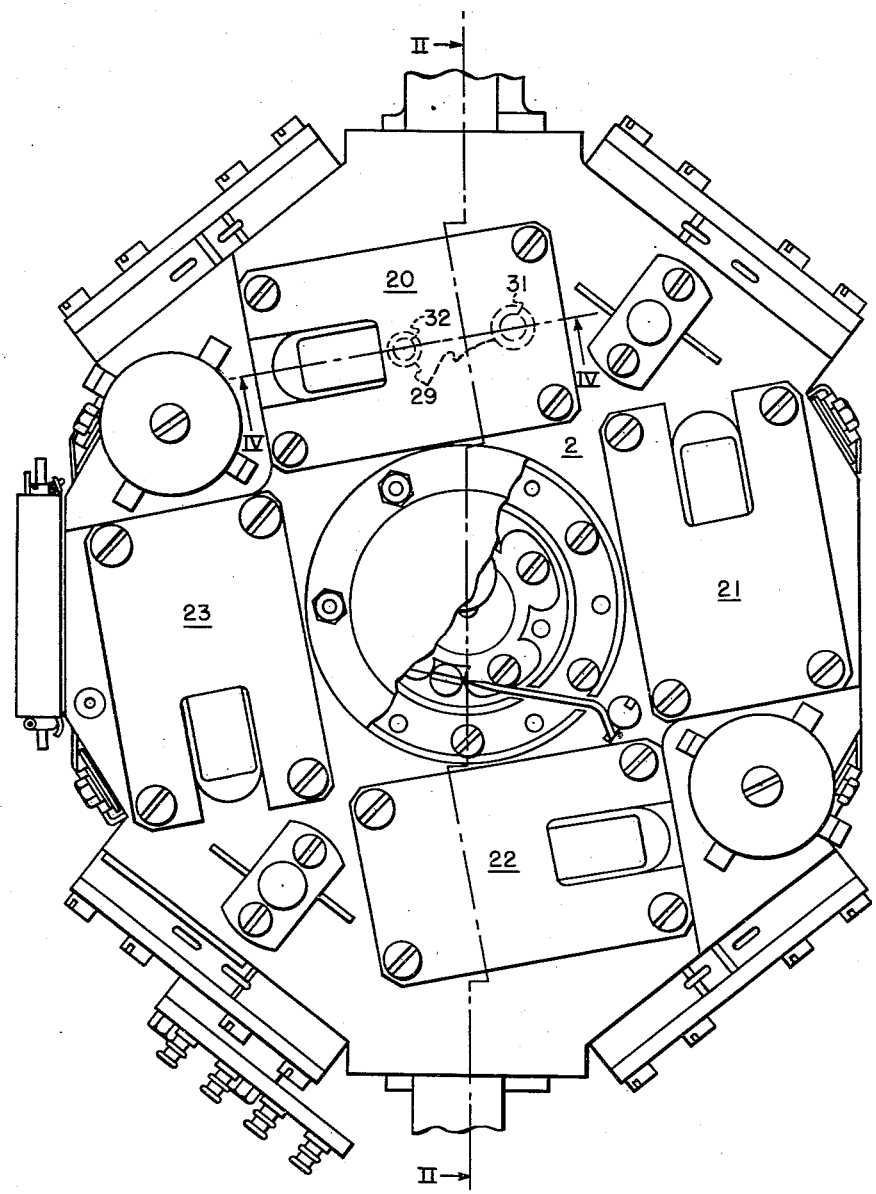
Fig. 1 shows the outer housing of a gyroscope having pick-offs according to the invention.
Figure 2:
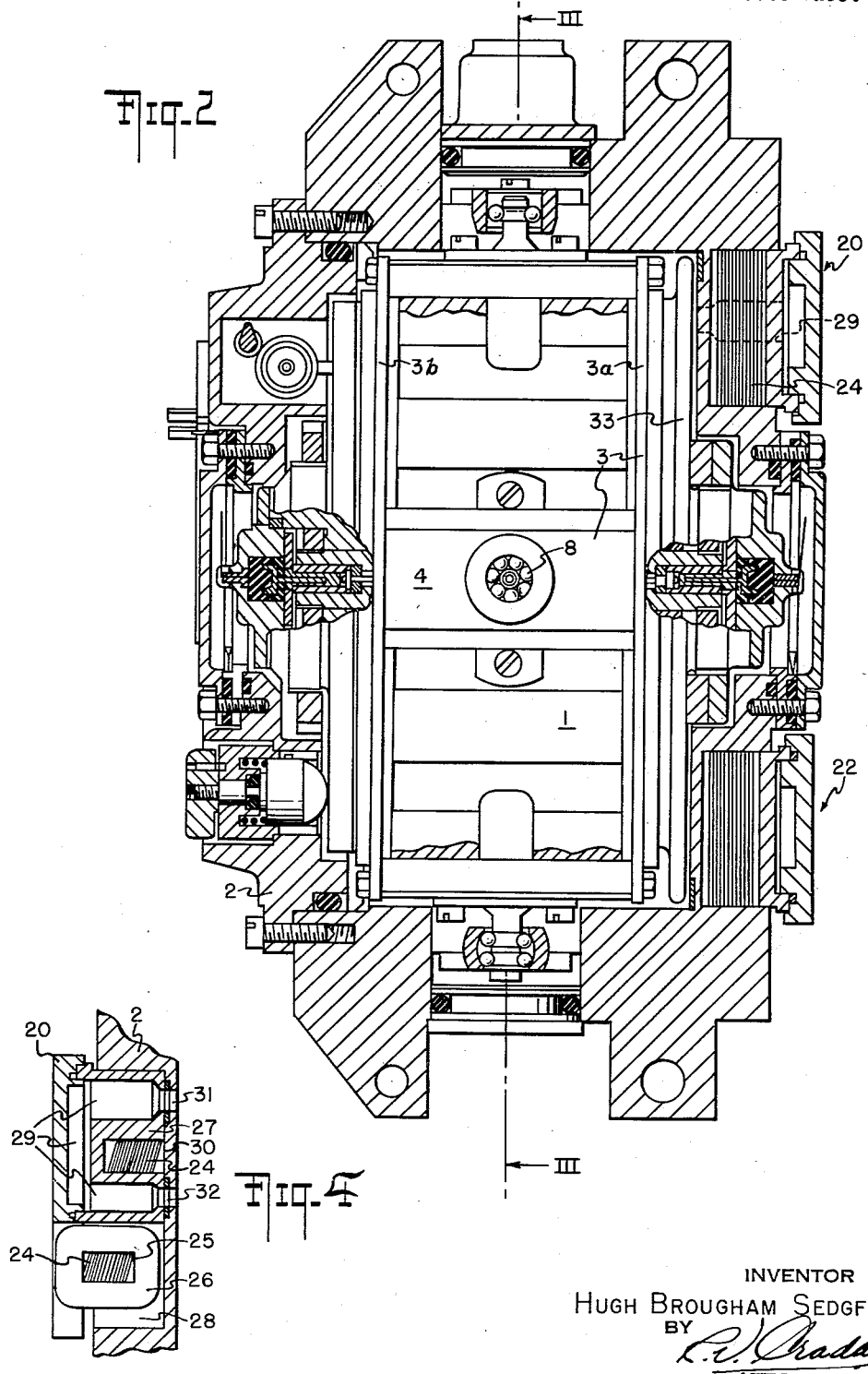
Fig. 2 is a section of the line II—II of Fig. 1, showing the rotor casing within the housing, and a sectional view through a pick-off.
Figure 3:
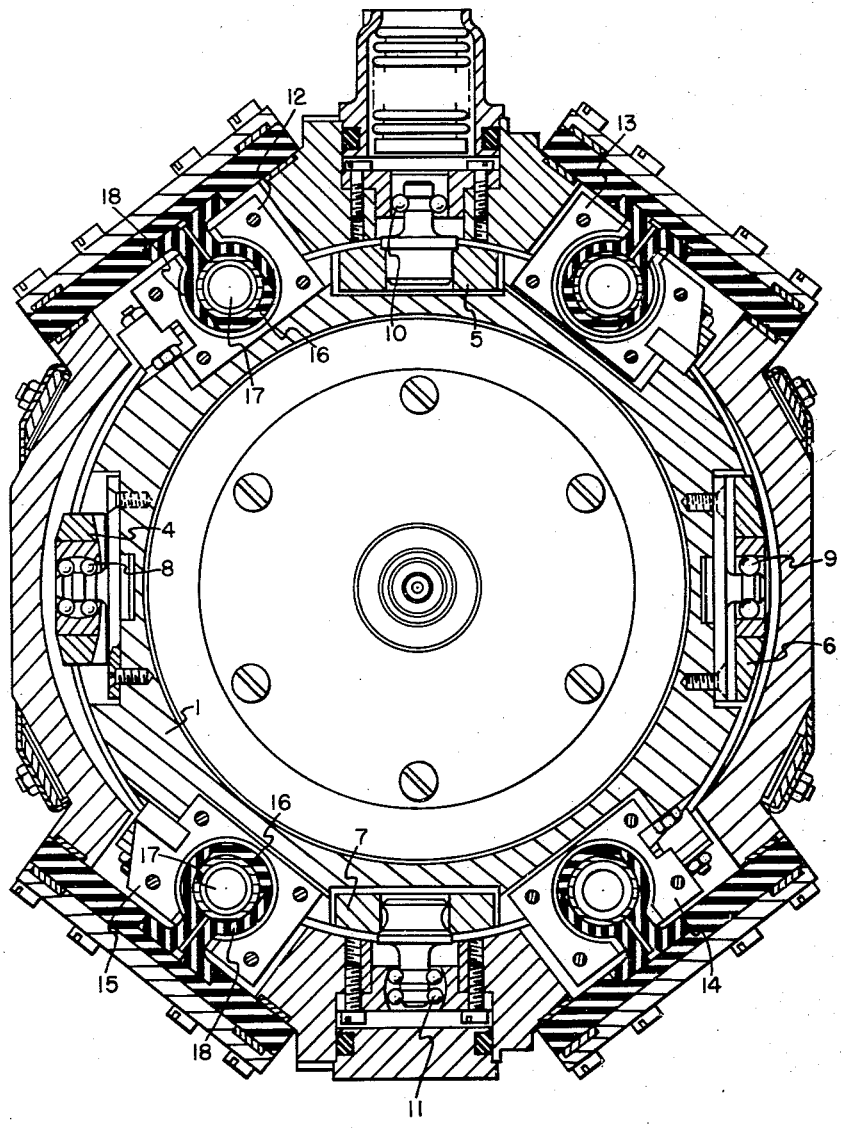
Fig. 3 is a section through the line III—III of Fig. 2, showing the gimbal axes and the torque motors.

Referring generally to Figs. 1, 2 and 3, the gyroscope has a rotor case 1 which lies closely inside a closed and sealed outer housing 2. Both the rotor case and the outer housing are of generally cylindrical shape, and they are co-axially arranged. The external surface of the case and the internal surface of the housing are of uniform conforming configurations.

The relatively narrow gap between them, and all other spaces in the interior of the outer housing are filled with a fluid such as mercury. The rotor case with the contained rotor has a mean density substantially the same as that of the mercury, and it floats in the mercury in neutral equilibrium, so that the outer housing is a float chamber.

The rotor case 1 is located centrally in the outer housing or casing 2 by a gimbal frame 3 which prevents rotation of the rotor case about the common axis of the cylinders. The gimbal frame 3 consists essentially of two hoops 3a and 3b spaced apart in a direction parallel to the axis of the cylinders, and lying outside the circumference of the rotor case, the two hoops being interconnected by four bars, 4, 5, 6 and 7 parallel to the axis of the cylinders. Thus the gimbal frame is an open framework. Through the holes in it between the cross bars the rotor case 1 extends towards the inner surface of the outer housing 2.

The rotor case 1 is mounted in ball bearings, 8, 9 in one pair of diametrically opposite bars 4, 6 of the gimbal frame 3. These bearings define the inner gimbal axis about which the rotor case pivots in the gimbal frame. The gimbal frame or ring 3, in turn, is mounted in ball bearings 10, 11 in the outer housing 2, these bearings defining the outer gimbal axes about which the gimbal ring pivots in the outer housing. The gimbal ring also has a mean density the same as that of mercury, and thus also floats in neutral equilibrium in the mercury, The rotor case is accordingly bouyantly supported within the housing.

Torque motors 12, 13, 14 and 15 provide forces directly between the outer housing and the rotor case. These motors are located in positions spaced angularly between the gimbal axes, in accordance with the teaching of U.S. application S.N. 443,578 and now Patent No. 2,868,021 and are energised in pairs in the manner described in the application. The torque motors are of the type in which a coil 16 carrying current and secured to the outer housing is disposed in an annular air gap between an inner cylindrical magnetic pole 17 and an outer cylindrical magnetic pole 18. The magnet system consists of two pot magnets disposed face to face with the coil arranged symmetrically in the air gap of the two pot magnets. The pot magnets are fixed in relation to the rotor case.

The gyroscope is provided with four pick-offs, 20, 21, 22 and 23 according to the invention, in order to give a measure of the relative angular position between the rotor case 1 and the outer housing 2. The construction of a pick-off is best seen in Fig. 4.

Each pick-off is a transformer having a core 24 of laminated magnetic material forming a closed rectangular flux path or magnetic circuit having a central window. On one leg 25 is disposed a primary winding 26. The transformer lies in a housing 27 which is fixed in a recess 28 in the outer side of the wall of the outer housing 2 of the gyroscope. A passage 29 is formed in the housing looped around the othr leg 30 of the magnetic core 24 and communicates with two openings 31, 32 in the inner wall of the recess 28 in the wall of the outer housing. Thus the passage 29 communicates through these openings with the mercury in the interior of the outer housing. The end wall 33 of the rotor case, as seen in Fig. 2, lies close to and normally parallel to the wall of the outer housing in which the openings 31, 32 lie.

The internal U-shaped passageway 29 in the casing or transformer member 2 encircles the core of the transformer and terminates at the surface openings 31, 32. The cooperating elements of the pick-off have conforming surface configurations that are preferably flat at the portions thereof including the openings 31, 32. The respective elements are arranged with respect to one another so that the gap between the juxtaposed surfaces thereof and between the openings 31, 32 changes its cross-sectional area with relative movement between the parts. Accordingly, the resistance of the single turn secondary of the transformer provided by the electrically conductive fluid filling the gap and the U-shaped passageway is dependent on the spaced relation between the casing 2 and case 1.

Clockwise rotation of the rotor case 1 about the inner gimbal axis defined by bearings 8 and 9 causes the end wall 33 to move towards the end wall of the outer housing in the neighbourhood of pick-off 20. In this way the liquid path between the openings 31 and 32 is narrowed. This increases the electrical resistance of the single-turn secondary circuit looped with the magnetic core and formed in part by the conducting mercury in the passage 29. This change in resistance is reflected in the primary circuit as a change in the impedance presented by the primary to a source of electromotive force. An opposite change is produced in transformer 22.

These changes may be used to provide a pick-off signal in the following manner. The two primary windings of the pick-offs 20 and 22 are connected in series across a source of electromotive force and two equal impedances, for example, resistors, are connected in series across the same source so as to provide a balanced bridge circuit with the source connected across one diagonal. Angular displacement of the rotor case relative to the outer housing about the inner gimbal axis unbalances the bridge so that a pick off signal may be obtained from the other diagonal.

The second pair of pick-offs 21 and 23 are connected in a similar bridge circuit, from which a signal is derived which is a measure of the relative displacement of the rotor case and the outer housing about the inner gimbal axis.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electrical pick-off for a gyroscopic instrument of the character having a closed housing of uniform internal surface configuration containing an electrically conductive fluid, a rotor case of uniform external surface configuration conforming to the internal surface configuration of the housing supported within said housing with freedom about an axis to vary the width of a relatively narrow fluid gap between juxtaposed surfaces of the housing and case; a wound magnetic core fixed to the housing at the variable gap surface thereof providing a closed magnetic circuit, and a passageway in said housing encircling said core and containing the conductive fluid therein having spaced openings at the variable gap surface thereof, the gap and passageway fluid providing a single turn secondary winding for the core whose resistance depends on the cross sectional area of the fluid in the portion of the gap between the openings in the housing.

2. The combination claimed in claim 1, in which the surface configurations of the housing and case are cylindrical with flat end walls, and the variable fluid gap is between juxtaposed portions of the end walls of the housing and case.

3. The combination claimed in claim 1, in which the housing is filled with the conducting fluid, the conducting fluid is mercury, and the case is buoyantly supported within the housing by the mercury.

References Cited in the file of this patent

UNITED STATES PATENTS

| | | |
|---|---|---|
| 1,687,970 | Corliss | Oct. 16, 1928 |
| 1,717,280 | Thompson | June 11, 1929 |
| 2,555,513 | Schweitzer | June 5, 1951 |
| 2,567,682 | Silberstein | Sept. 11, 1951 |
| 2,852,942 | Gerard | Sept. 23, 1958 |